(12) United States Patent
Hoshizuki

(10) Patent No.: US 11,303,733 B2
(45) Date of Patent: Apr. 12, 2022

(54) SERVER APPARATUS, CLIENT APPARATUS, AND DATA PROCESSING SYSTEM

(71) Applicant: AXELL CORPORATION, Tokyo (JP)

(72) Inventor: Yusuke Hoshizuki, Tokyo (JP)

(73) Assignee: AXELL CORPORATION, Tokyo (JP)

( * ) Notice: Subject to any disclaimer, the term of this patent is extended or adjusted under 35 U.S.C. 154(b) by 36 days.

(21) Appl. No.: 17/083,155

(22) Filed: Oct. 28, 2020

(65) Prior Publication Data

US 2021/0044676 A1     Feb. 11, 2021

Related U.S. Application Data

(62) Division of application No. 16/275,240, filed on Feb. 13, 2019, now abandoned.

(30) Foreign Application Priority Data

Feb. 15, 2018   (JP) ................. JP2018-24957

(51) Int. Cl.
  *H04L 67/01*  (2022.01)
  *H04L 67/10*  (2022.01)
  (Continued)

(52) U.S. Cl.
  CPC .......... *H04L 67/42* (2013.01); *G06F 16/2465* (2019.01); *H04L 9/0637* (2013.01);
  (Continued)

(58) Field of Classification Search
  CPC combination set(s) only.
  See application file for complete search history.

(56) References Cited

U.S. PATENT DOCUMENTS 11,164,107 B1 * 11/2021 Craib ................... H04L 63/00
2017/0278126 A1 * 9/2017 Rowley .............. G06Q 30/0227
(Continued)

FOREIGN PATENT DOCUMENTS

EP         3376455 A1    9/2018
JP      2017-091148 A    5/2017
(Continued)

OTHER PUBLICATIONS

Japanese Office Action dated Feb. 25, 2020 issued in Japanese Application No. 2018-24957, Total 9 pages.
(Continued)

*Primary Examiner* — El Hadji M Sall
(74) *Attorney, Agent, or Firm* — Masuvalley & Partners

(57) ABSTRACT

A server apparatus transmits information including a hash value of a previous block, data of a current block, and a search range with regard to one blockchain system to a client apparatus in a mining pool. The client apparatus calculates a Nonce value based on the information transmitted from the server apparatus and transmits the calculated Nonce value to the server apparatus. The server apparatus can transmit information regarding a plurality of blockchain systems to the client apparatus. The server apparatus decides one blockchain system based on a predetermined condition, transmits information related to the decided blockchain system to the client apparatus, and causes the client apparatus to perform mining.

8 Claims, 14 Drawing Sheets

(51) Int. Cl.
*H04L 9/06* (2006.01)
*G06F 16/2458* (2019.01)
*H04L 29/06* (2006.01)

(52) U.S. Cl.
CPC .......... *H04L 63/1466* (2013.01); *H04L 67/10* (2013.01); *G06F 2216/03* (2013.01); *H04L 2209/38* (2013.01)

(56) References Cited

U.S. PATENT DOCUMENTS

| | | | |
|---|---|---|---|
| 2018/0130092 A1* | 5/2018 | Nahass | A63F 13/352 |
| 2019/0253256 A1* | 8/2019 | Saab | H04L 9/0637 |
| 2019/0306190 A1* | 10/2019 | Suraparaju | G06Q 20/0655 |
| 2021/0058231 A1* | 2/2021 | Nogayam | G06Q 20/02 |
| 2021/0314396 A1* | 10/2021 | Basu | H04L 9/0894 |

FOREIGN PATENT DOCUMENTS

| | | |
|---|---|---|
| JP | 2017-207860 A | 11/2017 |
| JP | 201721528 A | 12/2017 |
| JP | 2019117620 A | 7/2019 |

OTHER PUBLICATIONS

Aso Jiro, 'Complete ingenuity of Linux', Nikkei Linux, Nikkei BP, Apr. 8, 2016, vol. 18, No. 5, Total 6 pages.

* cited by examiner

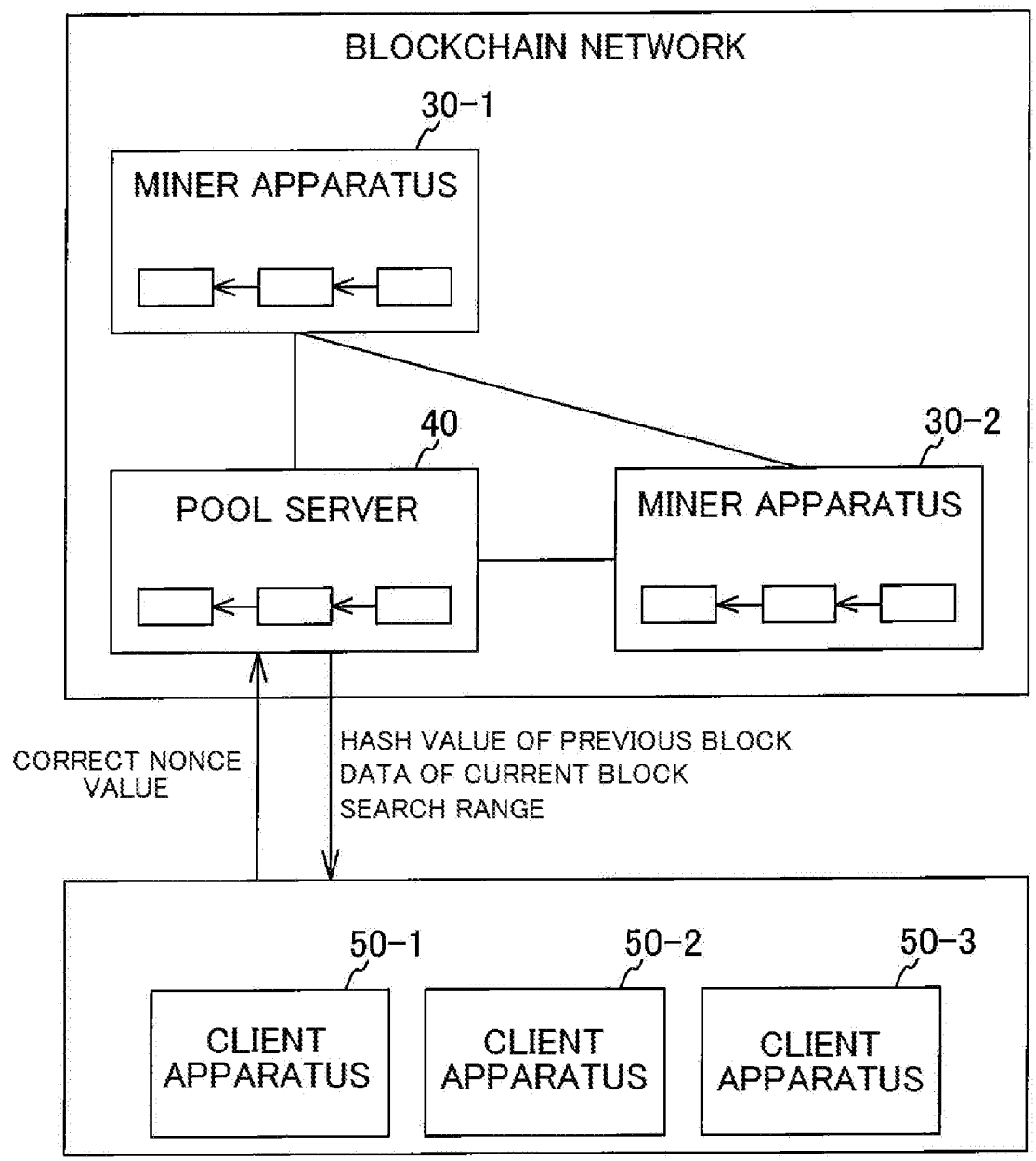

SERVER

FIG.7B

| | VIRTUAL CURRENCY A (BLOCKCHAIN A) | VIRTUAL CURRENCY B (BLOCKCHAIN B) |
|---|---|---|
| HASH FUNCTION | SHA-256 | Lyra2REv2 |
| HASH RATE BY GPU [MH/s] | 865 | 60 |
| RECENT DIFFICULTY LEVEL | 18731054752211.61 | 74330.69278829 |
| MINING EXPECTED VALUE[coin/H] | 1.24301939604510E−22 | 3.13236208247140E−15 |
| MINING SPEED EXPECTED VALUE [coin/hour] | 0.0000000000003870762 | 0.0006765902098138 |
| EXCHANGE RATE[¥/coin] | 1627000 | 1188 |
| EXPECTED VALUE OF MINING AMOUNT [¥/hour] | 0.0006297730 | 0.8037891693 |

PROVIDED THAT EXPECTED VALUE OF MINING AMOUNT = HASH RATE/(($2^{32}$)
*DIFFICULTY LEVEL)*EXCHANGE RATE

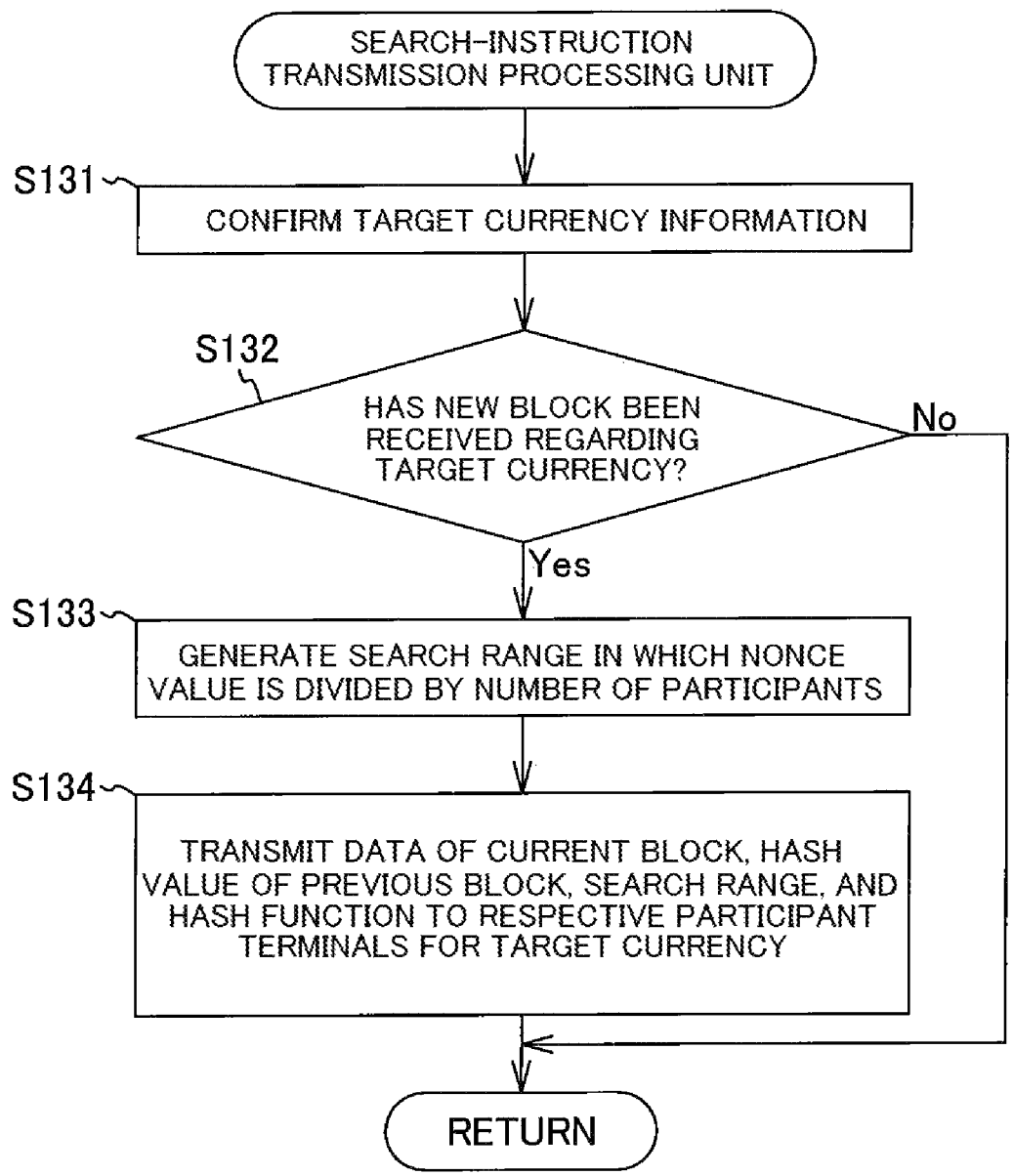

SERVER APPARATUS, CLIENT APPARATUS, AND DATA PROCESSING SYSTEM

CROSS-REFERENCE TO RELATED APPLICATION

This application claims priority under 35 U.S.C. § 120 as a divisional of U.S. patent application Ser. No. 16/275,240, filed Feb. 13, 2019, entitled "SERVER APPARATUS, CLIENT APPARATUS, AND DATA PROCESSING SYSTEM", which claims priority to Japanese Patent Application No. 2018-024957, filed on Feb. 15, 2018, the entire contents of which are incorporated herein by reference.

FIELD

The embodiments described herein relate to a data processing system, a server apparatus, and a client apparatus that execute distributed processing of data.

BACKGROUND

A mechanism referred to as "distributed processing" or "parallel processing" has been known in which at the time of processing mass data, processing is not executed by one terminal or server but data and information to be processed are divided so that pieces of divided data are processed by many client apparatuses connected to a server and processing results are shared on the server.

By causing a plurality of client apparatuses to execute processing in a distributed manner, reliability as a system can be increased and the processing speed can be greatly improved as compared to a case in which a server executes processing.

Such distributed processing is also useful for a technique referred to as "blockchain" that is recently known.

Virtual currency that utilizes the blockchain as a transaction ledger such as Bitcoin and monacoin has been widely recognized. In a mechanism referred to as "mining" related to the virtual currency, distributed processing referred to as "pool mining" in which computer power is centralized to perform block creation in an organized manner has been executed (for example, Japanese Patent Application Laid-Open No. 2017-207860 and Japanese Patent Application Laid-Open No. 2017-091148).

In the blockchain utilized in virtual currency, pieces of data such as transaction records are handled in a unit of block and blocks including pieces of data are connected in chronological order according to a predetermined method.

For example, in Bitcoin or a part of Altcoins, in order to connect (create) a new block to a blockchain, when calculating a hash value (for example, SHA-256 hash) with respect to data in which a hash value of a block immediately before in the blockchain, (transaction) data of a new block, and a numerical value referred to as "Nonce value" (for example, 32-bit fixed-length numerical value) are connected, a Nonce value such that high-order bits of the hash value continuously become 0 is searched. The searched (correct) Nonce value satisfying the condition is reported (to other apparatuses on a network), which is referred to as "mining".

The only way to search for the Nonce value satisfying such condition will be an exhaustive search (brute force search) over all the Nonce values. Due to one-wayness of a hash function, the exhaustive search requires enormous computing resources.

Therefore, the mining pool that performs distribution of search for a Nonce value and parallel processing can secure required computing resources easily, which is very useful.

In the mining pool, a server apparatus transmits data required for mining (a hash value of a block immediately before, and data of a new block to be connected) and information of a search range of the Nonce value handled by each client apparatus to a plurality of client apparatuses.

The client apparatus performs a search operation for the Nonce satisfying the condition based on the provided information. High speed processing is possible as compared to a case in which the best-subset selection procedure is performed for all the Nonce values by one server.

Such distributed parallel processing can be preferably applied not only to the mining in the blockchain but also to data processing in universities and research institutions, which cannot have high performance computing resources due to budget limitations, while having demands for executing mass data processing.

SUMMARY

The distributed processing mechanism such as the mining pool becomes a great help to virtual currency using a blockchain that is immediately after launch and includes a few client apparatuses (computing resources) participating in the mining.

It is because such a blockchain system is in urgent need of securing legitimate computing resources due to the following reasons.

That is, there may be a plurality of Nonce values satisfying the above condition (high-order bits of the hash value are 0) among the Nonce values being a numerical value having a 32-bit length. Therefore, a plurality of blocks may be reported as correct blocks with respect to a previous block, taking into consideration that a plurality of apparatuses are performing mining simultaneously.

In this case, in a blockchain system, both chains are once assumed to be correct, and then a chain extending long is determined as correct and a shorter chain is discarded as branching (fork).

An attacker who intends to insert improper data into a blockchain needs to connect improper data to a top and continuously connect blocks connected thereto to extend a chain. Such an attack becomes possible if computing resources of the attacker account for 51% of the entire computing resources used for mining (a so-called "51% problem").

With respect to such a problem, for example, in the case of Bitcoin, by paying Bitcoin to participants who have succeeded in mining as a reward, computing resources by a proper client apparatus (by a well-intentioned participant) are secured.

As a result, there are a sufficient number of client apparatuses that perform legitimate mining in the blockchain system, and it is not realistic to perform the above-described attack by preparing computing resources more than the number of client apparatuses.

However, when virtual currency using a blockchain is to be newly launched, or in a situation in which a reward cannot be set because a system is not a blockchain system related to virtual currency and legitimate computing resources cannot be secured sufficiently, there is a possibility that a malicious organization (agent) can acquire more than 51% of computing resources comparatively easily.

Under such circumstances, the mining pool is very useful in order to secure required computing resources and a mechanism that can effectively utilize computing resources held by existing mining pools has been desired.

Under the circumstances described above, an object of the present invention is to provide a distributed processing system that can provide computing power to a service requiring computing resources and a server apparatus that realizes the system, by effectively utilizing the computing resources.

A server apparatus according to one aspect of an embodiment comprises a processor. The processor executes a process including acquiring data from a plurality of different data sources and deciding one data source from the data sources based on a predetermined condition. The processor also executes a process including transmitting information including at least target data acquired from the data source decided by the deciding and a data processing method appropriate to the target data to a client apparatus and receiving result information generated based on the target data and the data processing method from the client apparatus.

According to the present invention, with the above configuration, a distributed/parallel processing system that can provide computing power to a system requiring computing resources and a server apparatus that realizes the system can be realized by effectively utilizing the computing resources.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is an explanatory diagram of the blockchain network including a mining pool.

FIG. 7B is a diagram illustrating expected values of a minable amount.

FIG. 8 is a flowchart for explaining search instruction transmission processing executed by the distributed processing server (search-instruction transmission processing unit) according to the embodiment.

DESCRIPTION OF EMBODIMENTS

An embodiment of the present invention will be described below in detail with reference to the accompanying drawings.

Figure 1A:
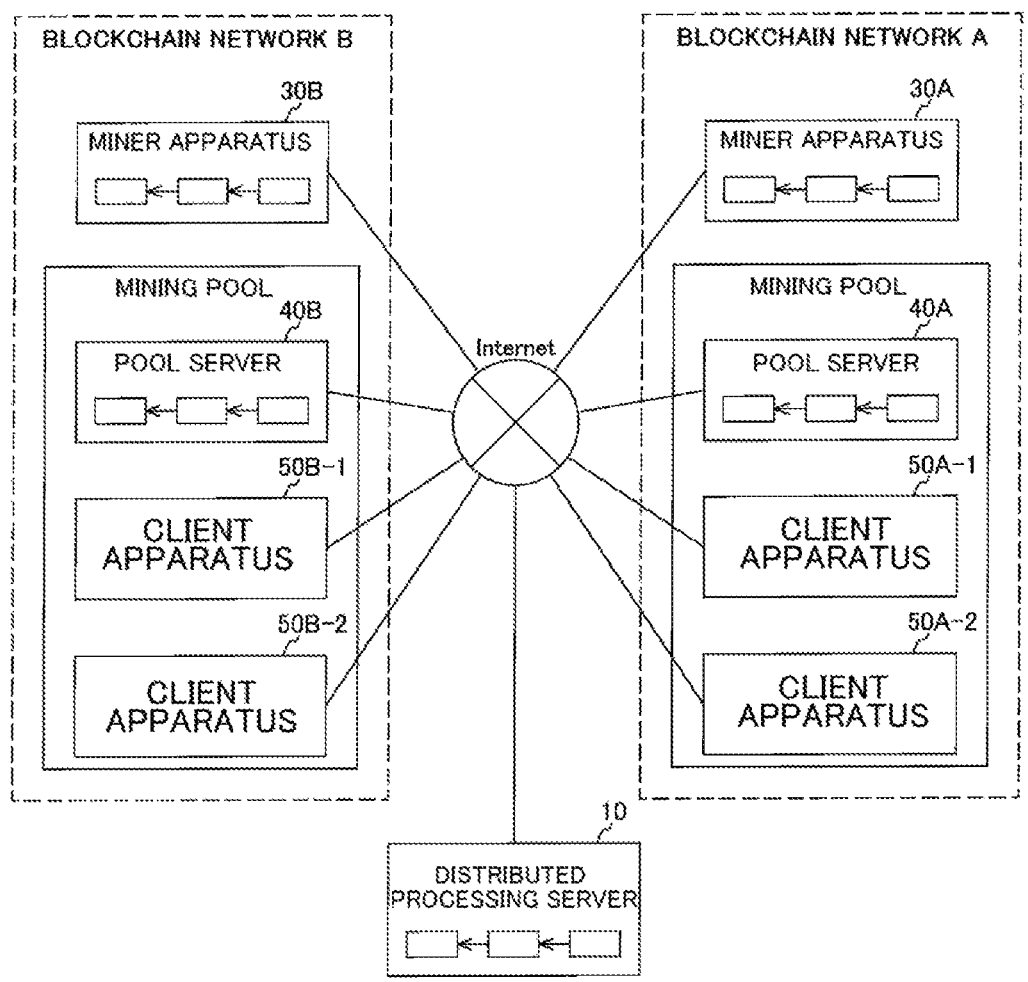
FIG. 1A and FIG. 1B are explanatory diagrams of an outline of a blockchain network to which a distributed processing server according to an embodiment of the present invention is applied.
Figure 1B:
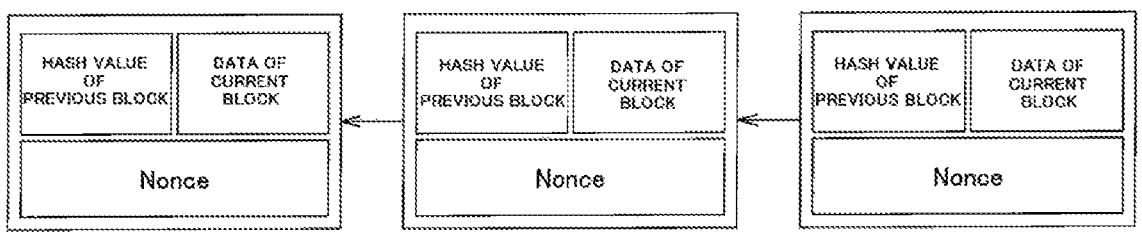

FIGS. 1A and 1B are explanatory diagrams of an outline of a blockchain network to which a distributed processing server according to the present embodiment is applied.

FIG. 1A is a schematic diagram illustrating a configuration of the blockchain network.

As illustrated in FIG. 1A, in the blockchain network, a distributed processing server (mining server) 10 according to the present embodiment, a miner apparatus 30 used by a miner who participates in the blockchain network to perform a mining (proof of work) operation, a client apparatus 50 used by a pool participant who does not directly participate in (connect to) the blockchain network but participates in a mining pool to perform the mining work, and a pool server 40 that provides the mining pool are connected to the Internet.

There are many blockchains including the one used for virtual currency. As the virtual currency, one referred to as "Altcoin" has been known other than the representative Bitcoin. As representative coins of Altcoins, Ethereum, and Monacoin have been known.

On the Internet there are a blockchain network causing to operate and function Bitcoin, and blockchain networks causing to operate and function various Altcoins.

Many miner apparatuses 30 and pool servers 40 are respectively connected to the respective blockchain networks to perform the proof of work operation.

For example, a blockchain network A includes a miner apparatus 30A, a pool server 40A forming a mining pool, and client apparatuses 50A (50A-1, 50A-2, . . . ).

Further, a blockchain network B includes a miner apparatus 30B, a pool server 40B forming a mining pool, and client apparatuses 50B (50B-1, 50B-2, . . . ).

The blockchain network is a P2P (Peer to Peer) network that does not have a centralized server. The same blockchain is stored in a storage provided in the respective miner apparatuses belonging to the blockchain network and storages provided in the server apparatus and the pool server 40. This is why the blockchain is referred to as "distributed ledger of transactions".

FIG. 1B is a diagram illustrating a blockchain held by an apparatus belonging to a blockchain network.

With reference to FIG. 1B, an outline of the blockchain is explained.

The blockchain is established by connecting pieces of transaction information occurring sequentially in a unit of block.

That is, in the blockchain technology, pieces of data, contents of which are desired to be guaranteed, such as records of transactions and contracts are handled in a unit of block. The blockchain is created by interconnecting the blocks (in a form of chain) according to a predetermined method. In order to create a blockchain, a hash function is used, and the hash function is a function for obtaining a hash value having a fixed length with respect to arbitrary data having an arbitrary length.

The hash function has a characteristic of one-wayness and it is easy to obtain a hash value from arbitrary data. On the contrary, it is thought to be realistically impossible to restore original data from the hash value.

In order to connect a new block to a blockchain, a hash value (for example, SHA-256 hash) of data including a hash value of a block immediately before in the blockchain, (transaction) data of a new block to be connected, and a numerical value referred to as Nonce value (for example, a 32-bit fixed-length numerical value) is calculated, such a Nonce value that high-order bits thereof (for example, upper 10 bits) become 0 is searched.

Because the SHA-256 hash value takes a substantially random 256-bit value, a probability that the upper 10 bits become 0 at the time of selecting a certain Nonce value becomes 1/1024. However, due to the one-wayness of the hash function, performing the exhaustive search is basically the only applicable method. It is referred to as mining that a Nonce value such that high-order bits of a hash value become 0 is detected and reported by performing the exhaustive search.

As a result, as illustrated in FIG. 1B, the respective blocks in the blockchain include data of the block, a hash value of a block immediately before, and a Nonce value.

In such a blockchain, because the respective blocks include a hash value of a block immediately before, the legitimacy of all the blocks can be confirmed by sequentially tracking a block from a top (the oldest block as a point of origin).

If it is tried to falsify a block in the middle, it is required to recalculate the None values of all the blocks thereafter. However, because the exhaustive search needs to be performed with respect to all the blocks, it is computationally impossible.

With such characteristics, the reliability of the blockchain is guaranteed.

It is very difficult to obtain the Nonce value in itself. However, by using a Nonce value detected once, it is very easy to execute a process to add a new block to a blockchain.

Because the hitting probability is 1/1024, although the flexibility of the Nonce value is 32 bits, there may be a plurality of Nonce values such that the upper bits of a hash value become 0. Therefore, if it is taken into consideration that there are a plurality of client apparatuses that are performing mining simultaneously, there may be a case in which a plurality of blocks are reported as correct.

In this case, in a blockchain system, both chains are once assumed to be correct, and then a chain extending long is determined as correct and a shorter chain is discarded as branching (fork).

That is, an attacker who intends to insert improper data into a blockchain needs to connect improper data to a top and continuously connect blocks thereto to extend a chain.

However, such an attack can be done if the computing resources of the attacker exceed the entire computing resources of the proper client apparatuses that are performing mining (51% of the entire computing resources).

Conversely, to maintain the safety of the blockchain, it is required to secure sufficient computing resources by the proper client apparatuses.

Therefore, for example, in the case of Bitcoin, by paying the Bitcoin to the client apparatus which has succeeded in mining as a reward, users who perform mining are collected to secure computing resources by proper client apparatuses.

In a blockchain system in which the market has been sufficiently developed already such as Bitcoin, there are a sufficient number of proper client apparatuses that perform mining and it is no longer realistic to prepare computing resources more than the computing resources thereof.

However, in a case where a virtual currency using a blockchain is newly launched or a situation where the client apparatuses that perform mining cannot be secured sufficiently because a blockchain system other than the virtual currency is employed and rewards cannot be set, there is a possibility that a malicious organization (entity) can secure more than 51% of computing resources comparatively easily.

Under such circumstances, required computing resources can be easily secured by utilizing an existing mining pool, which is very useful.

A distributed processing server 10 according to the present embodiment constitutes a mining pool as in the pool server 40 illustrated in FIG. 1A.

However, although described later, the distributed processing server 10 according to the present embodiment can function as a pool server not only for a single blockchain but also for a plurality of blockchains.

The distributed processing server 10 participates in the P2P network of a plurality of different blockchains to acquire pieces of information of the respective blockchains.

As a result, client apparatuses connected to the distributed processing server 10 can participate in mining with respect to the plurality of different blockchains.

FIG. 2 is an explanatory diagram of a blockchain network according to the present embodiment including a mining pool.

The mining pool will be outlined with reference to FIG. 2.

The blockchain network is configured by interconnecting a plurality of miner apparatuses connected to the Internet to form a P2P network.

The blockchain network according to the present embodiment includes the pool server 40 that manages a mining pool.

According to the technique of a blockchain (virtual currency), mining intended to receive rewards is being performed systematically on a mass scale by agents having large computing resources. On the other hand, a mechanism referred to as "mining pool" is present in which individual users who do not have large computing resources are collected, mining is performed by dividing a search range between the users, and the acquired rewards are divided equally among the users.

The pool server 40 transmits a hash value of a previous block in a blockchain, data of the current block (transaction data), and a search range of a Nonce value allocated to each client apparatus to each of the client apparatuses.

The client apparatus having received the data searches for a Nonce value as a correct value among the Nonce values in the search range.

When a Nonce value as a correct value has been found, the found Nonce value is transmitted to the pool server 40.

The finding of the Nonce value is the first finding through the blockchain network, the virtual currency as a reward is paid to an operator of the pool server 40. In the case of the mining pool, the acquired reward is often divided among the participants.

For example, when it is assumed that the Nonce value is 32 bits, search by the exhaustive search is performed by sharing roles in such a manner that among the Nonce values in a top block, (a client apparatus of) Mr. A performs search in a range 0 to 99, (a client apparatus of) Mr. B performs search in a range 100 to 199, and (a client apparatus of) Mr. C performs search in a range 200 to 299.

If one participant in the mining pool has succeeded in mining (detected a Nonce value as a correct value), the entire mining pool can acquire a reward.

The mining pool is established by dividing the reward acquired by the entire mining pool among all the participants.

Figure 3:
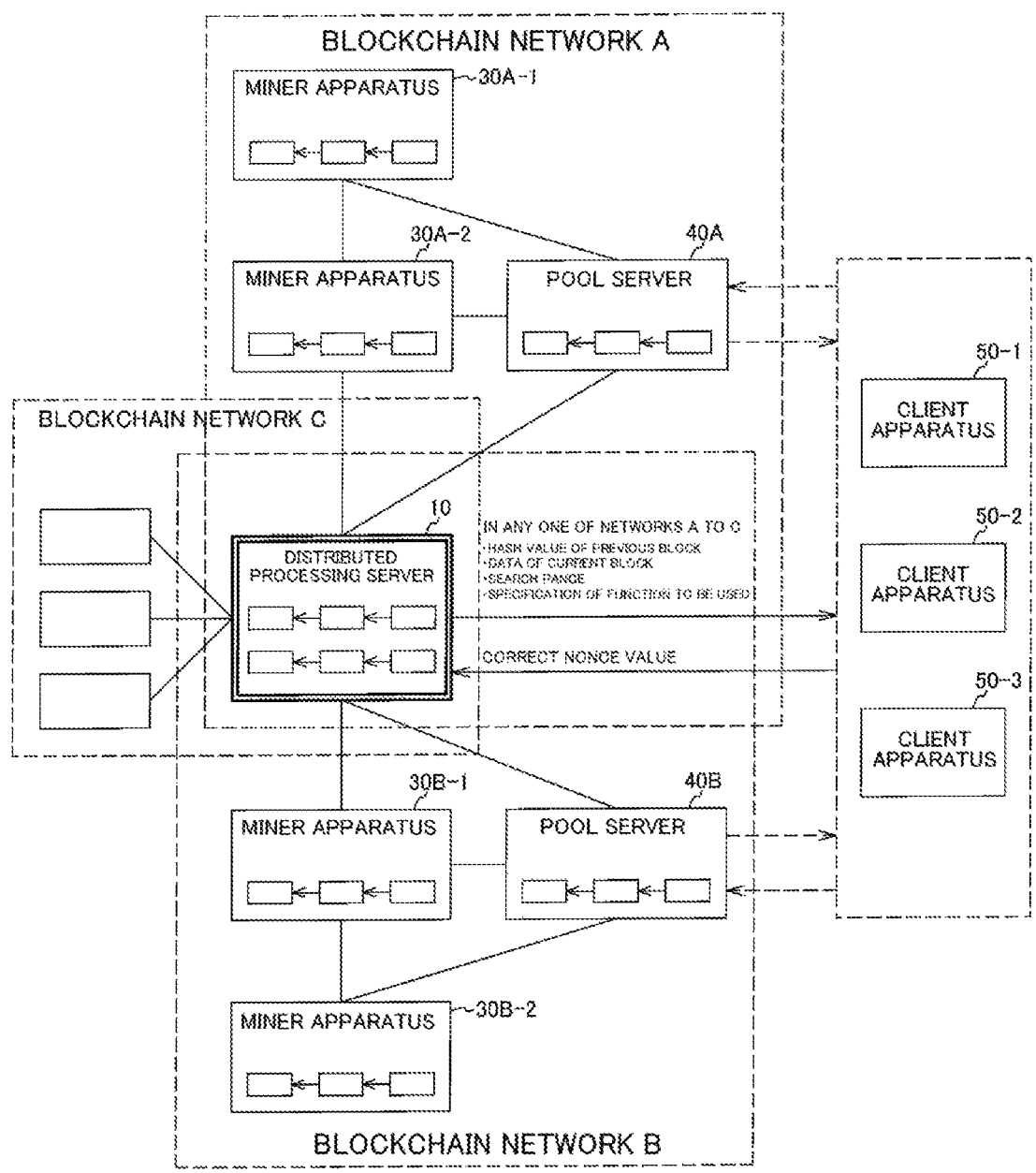
FIG. 3 is an explanatory diagram of characteristics of a distributed processing server according to a system of the embodiment.

FIG. 3 is an explanatory diagram of characteristics of the distributed processing server according to the system of the present embodiment.

As described above, the distributed processing server 10 according to the present embodiment has basically the same function as that of the pool server 40 illustrated in FIG. 2.

The distributed processing server 10 transmits a hash value of a previous block in a blockchain, data of the current block, and a search range of a Nonce value allocated to each client apparatus to each of the client apparatuses 50 (50-1, 50-2, and 50-3). The distributed processing server 10 also assigns a hash function to be used in the blockchain.

The client apparatus 50 having received the data searches for a Nonce value that becomes a correct value among the Nonce values in the search range, by using the assigned hash function and data.

Upon finding of a Nonce value as a correct value, the client apparatus 50 transmit the correct Nonce value to the distributed processing server 10.

The distributed processing server 10 transmits the correct Nonce value received from the client apparatus 50 to the pool server 40. The distributed processing server 10 receives a reward of the virtual currency and distributes the reward to the participants in the mining pool connected to the distributed processing server 10.

The distributed processing server 10 according to the present embodiment does not belong only to any specific blockchain network but also belongs to, for example, the blockchain network A, the blockchain network B, and a blockchain network C, as illustrated in FIG. 3, and stores blockchains for all the blockchain networks and acquires a new block.

The distributed processing server 10 according to the present embodiment can transmit data and a hash value related to a plurality of blockchains selectively to the client apparatuses 50 (50-1, 50-2, and 50-3).

The distributed processing server 10 according to the present embodiment can be said as an apparatus that connects these blockchain networks essentially functioning independently.

The client apparatus can be connected not to the distributed processing server 10 according to the present embodiment but to pool servers 40A and 40B belonging to other blockchain networks and participate in these blockchain networks. However, by being connected to the distributed processing server 10 according to the present embodiment, the client apparatus can participate in a plurality of blockchains indirectly and enjoy the merit thereof.

The distributed processing server 10 according to the present embodiment selects a blockchain advantageous (desired) to the participants in the mining pool from a plurality of blockchain networks based on predetermined criteria, and causes the participants to perform mining.

Participants in the mining pool perform mining based on the data and the hash value provided from the distributed processing server 10, and if one participant has succeeded in mining (found a Nonce value as a correct value), a reward (virtual currency) for the detection acquired from the blockchain network can be divided equally among the participants.

Further, as described later, in the present embodiment, not the virtual currency related to the blockchain to which mining has been performed, but a different virtual currency can be paid to the participants in the mining pool as the reward.

That is, participants in the mining pool perform mining of Bitcoin or other virtual currencies, and if any one of them has succeeded in mining, the virtual currency different from the currency to which they have performed mining, for example, Monacoin is divided equally as the reward.

In such a mining pool, for users who perform mining, their concern is a reward, and they have no concern with what they are mining. Therefore, a server that manages the mining pool selects the most efficient blockchain and transmits the selected blockchain to the client apparatuses, thereby enabling to perform efficient mining.

That is, in the case where a plurality of blockchain systems are present and rewards are respectively set with regard to mining, the server selects the most efficient blockchain system to be mined.

In order to decide which blockchain is effective for mining, for example, an expected value of a mining amount can be taken into consideration, as described later.

However, in the mining system according to the present embodiment, the blockchain that is a mining target is not limited to a blockchain for virtual currency.

For example, the blockchain network C is a blockchain for other than the virtual currency and a reward by a so-called "virtual currency" is not paid.

One object of the mining system according to the present embodiment is to provide sufficient computing resources also for a blockchain unaccompanied by such a reward.

Further, the blockchain is a mechanism realized by the open P2P network that does not have a specific manager. Recently, however, a client-server blockchain operated by a company has appeared.

While a blockchain used in virtual currency is a public chain in which any individual can participate, a blockchain used in corporate currency is a private chain in which only registered miners can perform mining. As in the mining pool, corporate currency can be established by transmitting hash values of the previous block, data of the current block, and the search range to terminals of registered users so that they can perform search for a Nonce value. Rewards of mining are decided by companies.

The mining system according to the present embodiment can be applied also to such a virtual currency system operated by companies, and one object of the present embodiment is to provide sufficient computing resources to such a virtual currency system.

Even when virtual currency is a mining target, decision is not always performed only based on an expected value of a minable amount.

It is because one object of the mining system according to the present embodiment is to provide sufficient computing resources to a blockchain, which has been recently launched and there is a risk of a malicious fork because the number of connected blocks is few.

Figure 4A:
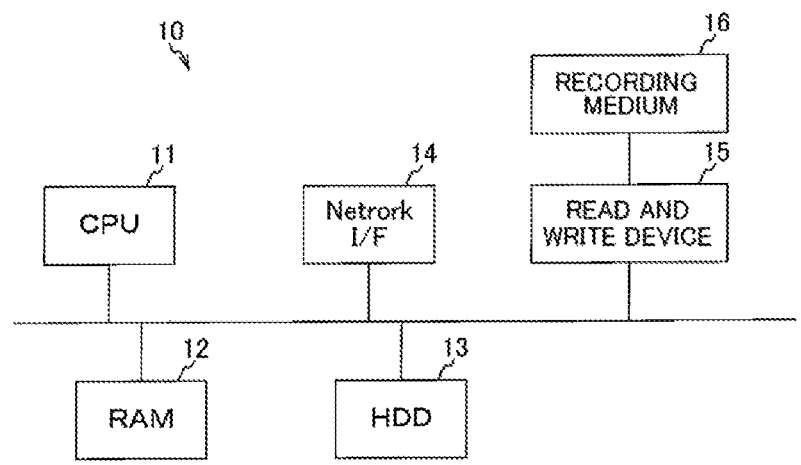
FIG. 4A is a hardware configuration diagram of the distributed processing server according to the embodiment.
Figure 4B:
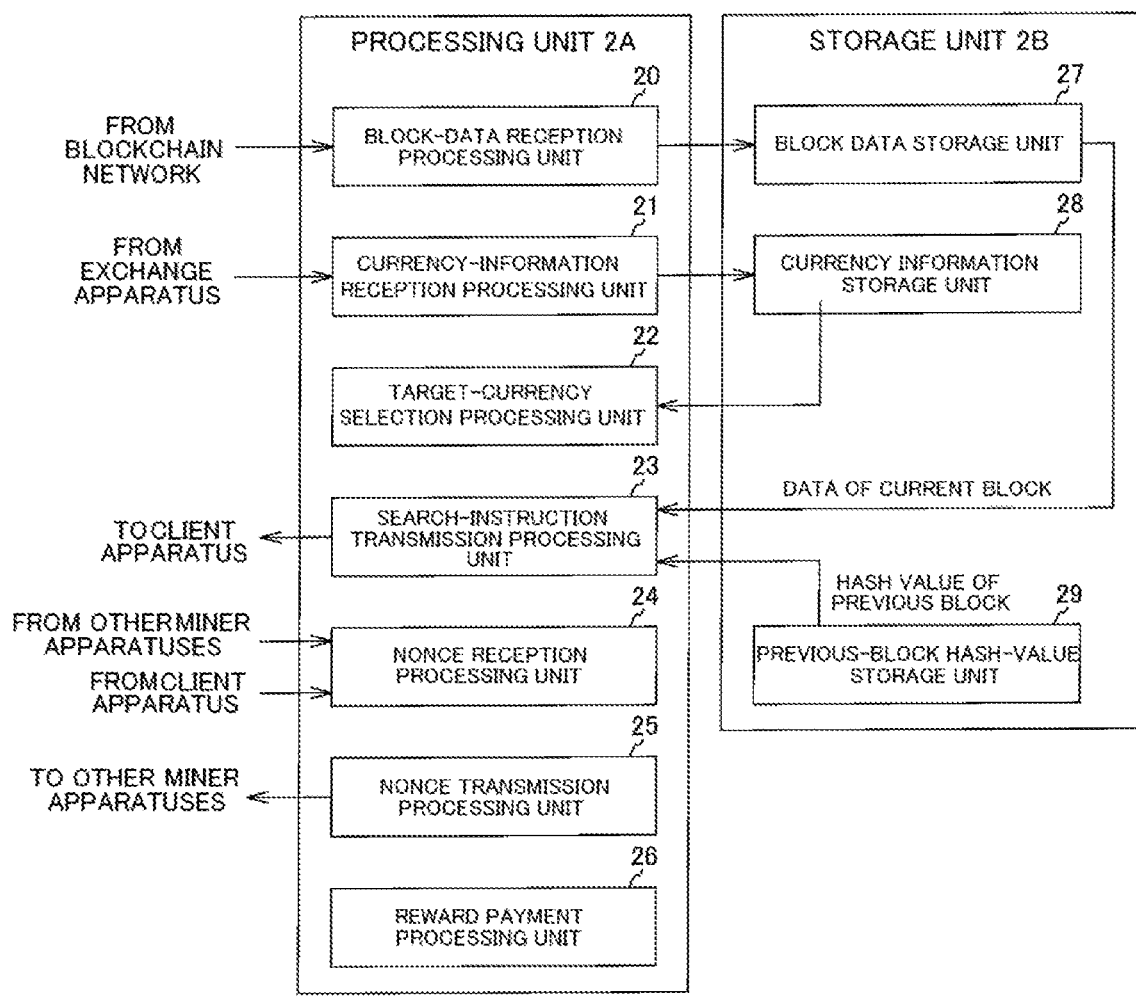
FIG. 4B is a functional configuration diagram of the distributed processing server according to the embodiment.

FIG. 4A is a hardware configuration diagram of the distributed processing server according to the present embodiment. FIG. 4B is a functional configuration diagram of the distributed processing server according to the present embodiment.

As illustrated in FIG. 4A, the mining server 10 as a distributed processing server includes a central processing unit (CPU) 11 being a processor that executes a general-purpose operating system for controlling the entire apparatus and executes a program (distributed processing program) for realizing the function of the distributed processing server 10, a random access memory (RAM) 12 in which various programs, temporary data, and variables are developed for the processing by the CPU 11, a hard disk drive (HDD) 13 and a read only memory (ROM) (not illustrated) in which programs and data are stored, a network I/F 14 for connecting the distributed processing server 10 to a network, a read and write device 15, and a recording medium 16. The processor can be a control circuit such as a field programmable gate array (FPGA) and an application specific integrated circuit (ASIC).

The read and write device 15 is controlled by the CPU 11 to perform read/write of data with respect to the detachable recording medium 16. The recording medium 16 stores various pieces of data therein. The recording medium 16 may memorize therein, for example, a distributed processing program for causing the CPU 11 to function as a processing unit 2A illustrated in FIG. 4B. The recording medium 16 is, for example, a Secure Digital (SD) memory card, a Floppy Disk (FD), a Compact Disc (CD), a Digital Versatile Disk (DVD), a Blu-ray Disk (BD: registered trademark), and a non-transitory computer readable recording medium (non-volatile computer readable recording medium) such as a flash memory.

As illustrated in FIG. 4B, executing the distributed processing program, the CPU 11 functions, for example, as the processing unit 2A. The processing unit 2A includes a block-data reception processing unit 20, a currency-information reception processing unit 21, a target-currency selection processing unit 22, a search-instruction transmission processing unit 23, a Nonce reception processing unit 24, a Nonce transmission processing unit 25, and a reward payment processing unit 26.

In a storage unit 2B, a block data storage unit 27, a currency information storage unit 28, a previous-block hash-value storage unit 29 are respectively set, and pieces of data are stored in the respective storage units by the respective processing units described above or pieces of data are read from the storage unit 2B.

The block data storage unit 27 stores therein the latest block data of the virtual currency handled by the distributed processing server 10 according to the present embodiment.

The currency information storage unit 28 stores therein rate information and the like regarding the virtual currency handled by the distributed processing server 10 according to the present embodiment.

The previous-block hash-value storage unit 29 stores therein a hash value of a previous block of the latest block, regarding the virtual currency handled by the distributed processing server 10 according to the present embodiment.

The block data storage unit 27, the currency information storage unit 28, and the previous-block hash-value storage unit 29 can be set to any of a RAM 12 and a HDD 13.

That is, the latest block data, rate information, and the hash value of the previous block acquired from the blockchain network can be handled only as temporary data held in the RAM 12, or can be stored as a file in the HDD 13 and then loaded onto the RAM.

The respective processing units will be outlined below.

The block-data reception processing unit 20 acquires newly generated block data from a blockchain network via the network I/F 14, regarding the virtual currency handled by the distributed processing server 10 according to the present embodiment, and stores the block data in the block data storage unit 27 set in the storage unit.

The currency-information reception processing unit 21 acquires rate information and the like of respective virtual currencies from server devices in exchanges or sales stores of the virtual currency present on the Internet via the network I/F 14 and stores the acquired information in the currency information storage unit 28.

The target-currency selection processing unit 22 executes processing for selecting a virtual currency to be mined by the mining pool, based on predetermined conditions in accordance with the rate information and the like stored in the currency information storage unit 28.

The search-instruction transmission processing unit 23 transmits, via the network I/F 14, the latest block data, a hash value of a previous block, and a search range of a Nonce value to the respective client apparatuses 50 in the mining pool, with regard to the virtual currency to be mined selected by the target-currency selection processing unit 22.

The Nonce reception processing unit 24 receives a Nonce value as a correct value from the client apparatus 50 in the mining pool (in case of success in search), or other miner apparatuses or other pool servers 40 belonging to the blockchain network via the network I/F 14.

Thereafter, the Nonce reception processing unit 24 uses the Nonce value to execute processing for connecting the latest block data to a blockchain held by the distributed processing server 10.

When the Nonce reception processing unit 24 receives a Nonce value as a correct value from the client apparatus 50 in the mining pool, the Nonce transmission processing unit 25 executes processing for transmitting the Nonce value to other miner apparatuses or other pool servers 40 belonging to the blockchain network via the network I/F 14.

By executing the processing, an operator of the distributed processing server 10 obtains the right to receive a reward, and if transmission of the Nonce value as a correct value is earliest in the blockchain network, the operator can receive the reward actually.

The reward payment processing unit 26 is a processing unit that performs payment of a reward (equal division) to participants in the mining pool, and performs remittance processing to wallets held by the participants for respective virtual currencies. The processing is performed as a remittance request to the exchanges of respective virtual currencies.

Figure 5:
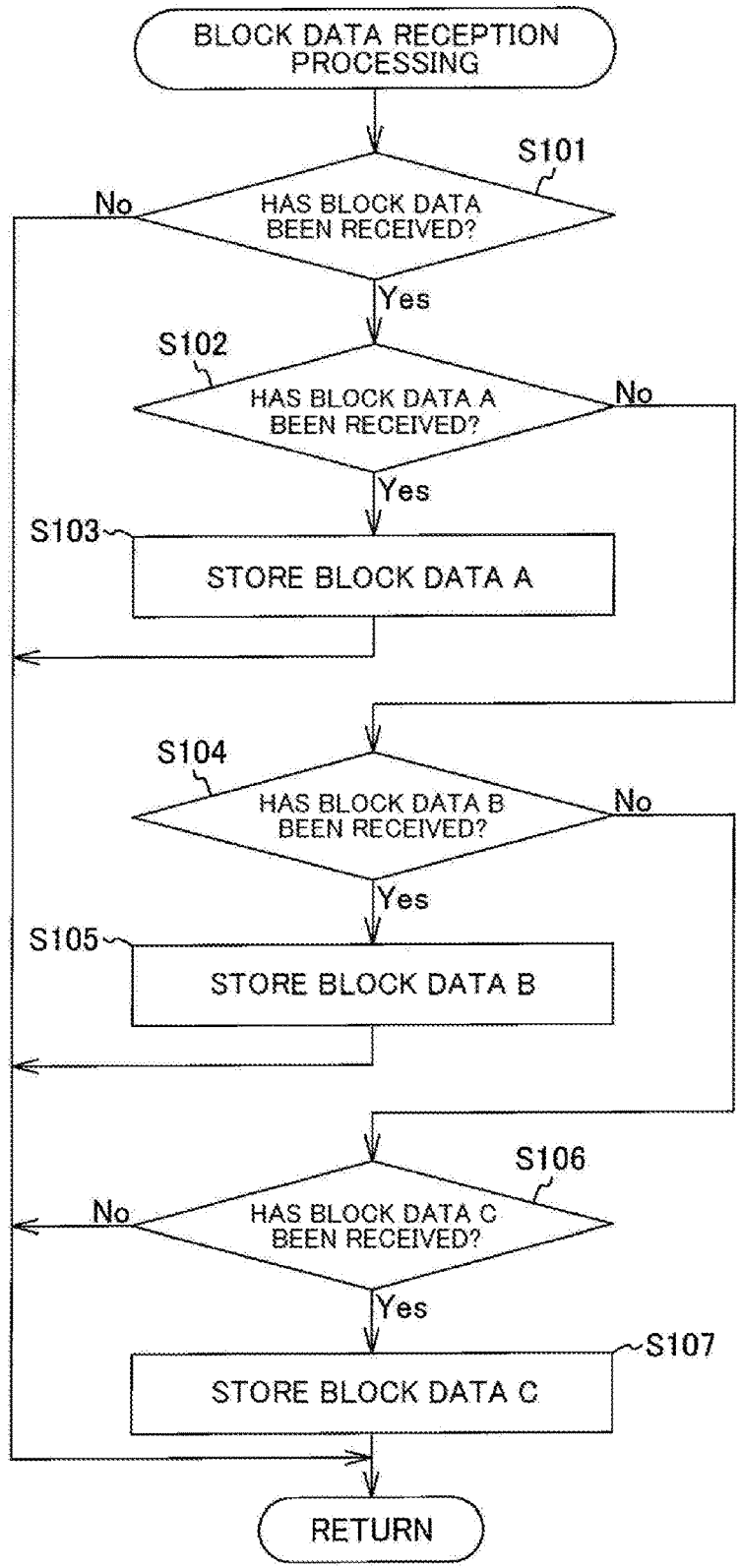
FIG. 5 is a flowchart for explaining block data reception processing executed by the distributed processing server (Block-data reception processing unit) according to the embodiment.

FIG. 5 is a flowchart for explaining block data reception processing executed by the distributed processing server (block-data reception processing unit) according to the present embodiment.

At Step S101, the block-data reception processing unit 20 determines whether block data has been received.

When it is determined that block data has been received (Yes at Step S101), the block-data reception processing unit 20 determines whether block data A related to the blockchain network A has been received at Step S102.

When it is determined that the block data A has been received (Yes at Step S102), the block-data reception processing unit 20 stores the received block data A in a block data storage unit 27A for the block data A in the storage unit 2B, at Step S103.

When it is not determined that the block data A has been received (No at Step S102), the block-data reception processing unit 20 determines whether block data B related to the blockchain network B has been received at Step S104.

When it is determined that the block data B has been received (Yes at Step S104), the block-data reception processing unit 20 stores the received block data B in a block data storage unit 27B for the block data B in the storage unit 2B, at Step S105.

When it is not determined that the block data B has been received (No at Step S104), the block-data reception processing unit 20 determines whether block data C related to the blockchain network C has been received at Step S106.

When it is determined that the block data C has been received (Yes at Step S106), the block-data reception processing unit 20 stores the received block data C in a block data storage unit 27C for the block data C in the storage unit 2B, at Step S107.

The blockchain network in which the distributed processing server 10 participates to receive the block data (transaction) is not limited to the three blockchain networks A to C, and can be more than three networks or can be two networks. However, from the spirit of the present embodiment, the distributed processing server 10 preferable to participate in at least two blockchain networks.

Figure 6:
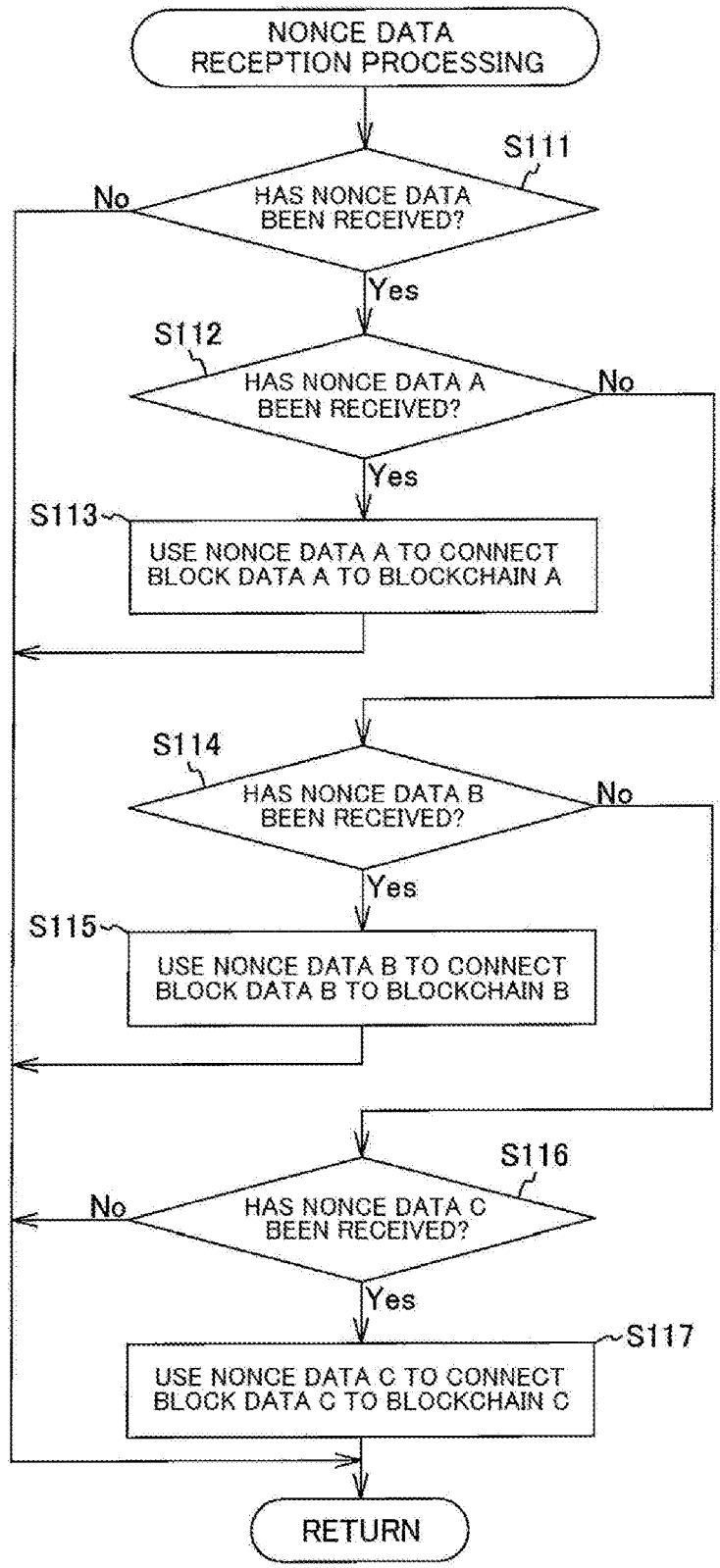
FIG. 6 is a flowchart for explaining Nonce value reception processing executed by the distributed processing server (Nonce reception processing unit) according to the embodiment.

FIG. 6 is a flowchart for explaining Nonce value (Nonce data) reception processing executed by the distributed processing server (Nonce reception processing unit) according to the present embodiment.

At Step S111, the Nonce reception processing unit 24 determines whether a Nonce value has been received.

When it is determined that the Nonce value has been received (Yes at Step S111), the Nonce reception processing unit 24 determines whether a Nonce value A related to the blockchain network A has been received at Step S112.

When it is determined that the Nonce value A has been received (Yes at Step S112), the Nonce reception processing unit 24 uses the received Nonce value A to execute processing for connecting the block data A stored in the block data storage unit 27A to a blockchain A at Step S113.

When it is not determined that the Nonce value A has been received (No at Step S112), the Nonce reception processing unit 24 determines whether a Nonce value B related to the blockchain network B has been received at Step S114.

When it is determined that the Nonce value B has been received (Yes at Step S114), the Nonce reception processing unit 24 uses the received Nonce value B to execute processing for connecting the block data B stored in the block data storage unit 27B to a blockchain B at Step S115.

When it is not determined that the Nonce value B has been received (No at Step S114), the Nonce reception processing unit 24 determines whether a Nonce value C related to the blockchain network C has been received at Step S116.

When it is determined that the Nonce value C has been received (Yes at Step S116), the Nonce reception processing unit 24 uses the received Nonce value C to execute processing for connecting the block data C stored in the block data storage unit 27C to a blockchain C at Step S117.

The received Nonce value is transmitted to a corresponding blockchain network by the Nonce transmission processing unit 25.

Figure 7A:
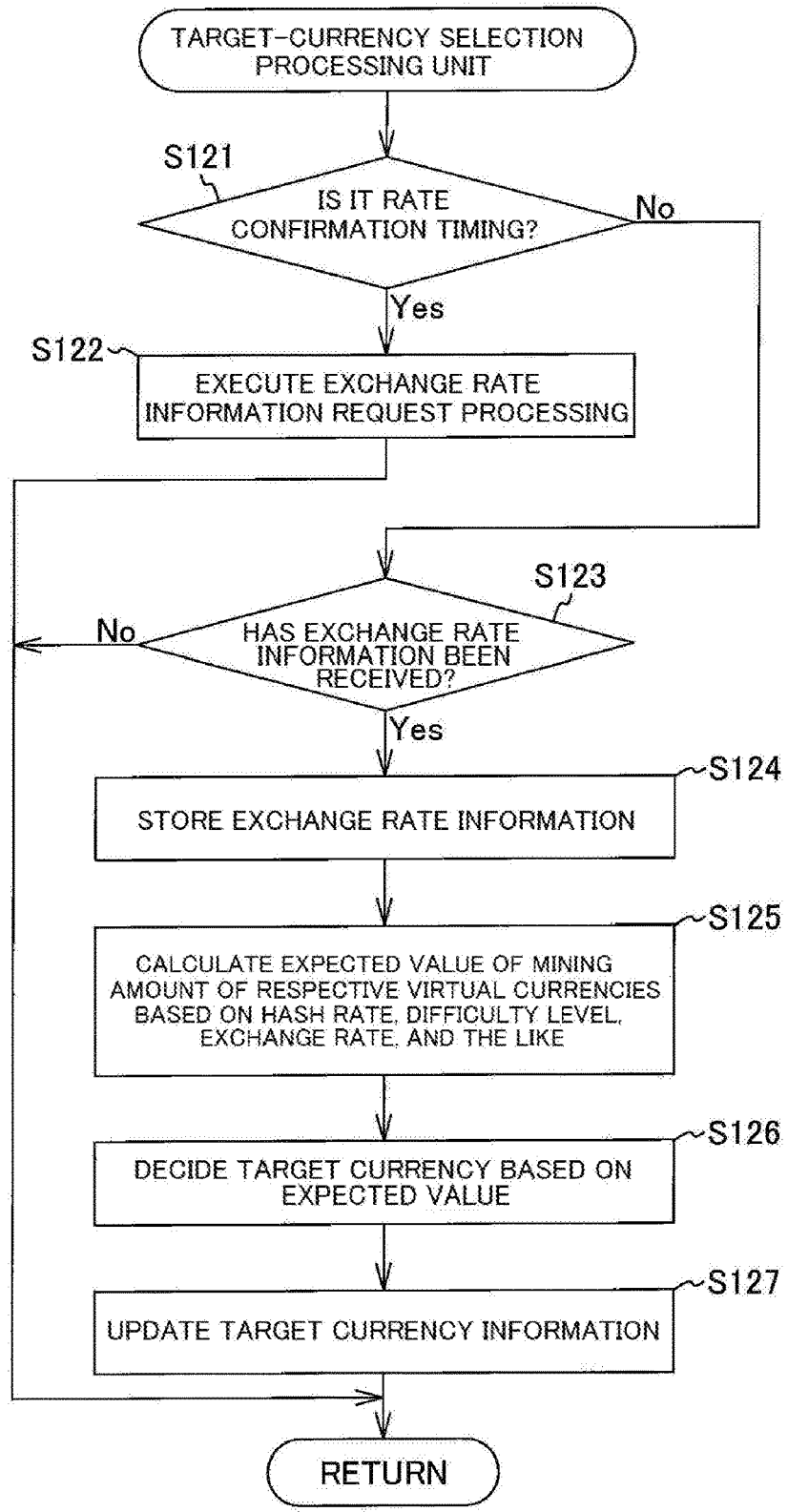
FIG. 7A is a flowchart for explaining target currency selection processing executed by the distributed processing server (target-currency selection processing unit) according to the embodiment.

FIG. 7A is a flowchart for explaining target currency selection processing executed by the distributed processing server (target-currency selection processing unit) according to the present embodiment.

In the flowchart illustrated in FIG. 7A, the mining server 10 (target-currency selection processing unit 22) regularly confirms exchange rates of virtual currencies that fluctuate at all times.

The target-currency selection processing unit 22 determines whether it is a confirmation timing of exchange rates at Step S121.

When it is determined that it is the confirmation timing (Yes at Step S121), the target-currency selection processing unit 22 executes processing for requesting exchange rate information to the servers in the exchanges and sales stores of respective virtual currencies present on the Internet at Step S122.

When it is not determined that it is the confirmation timing (No at Step S121), the target-currency selection processing unit 22 determines whether the exchange rates have been received from the servers in the exchanges and sales stores at Step S123.

When it is determined that the exchange rates have been received (Yes at Step S123), the target-currency selection processing unit 22 stores the received exchange rates in the currency information storage unit 28 of the storage unit 2B at Step S124.

At Step S125, the target-currency selection processing unit 22 calculates an expected value of a minable amount of the respective virtual currencies based on the hash rate, the difficulty level, and the exchange rate, and at Step S126, decides the mining target currency based on the calculated expected value.

FIG. 7B illustrates expected values of the minable amount.

For example, the expected values of the minable amount are presented by (Expression)Expected value=hash rate/((2^32)*difficulty level)*exchange rate.

The hash rate is the number of hash calculations per unit time (for example, one second), and the difficulty level is a coefficient indicating how few hits are with respect to 1/2^32.

As illustrated in FIG. 7B, for the virtual currency A, when it is assumed that a hash function is SHA-256, a hash rate [MH/s] by a GPU is 865, the recent difficulty level is 1873105475221.61, a mining expected value [coin/H] is 1.2430193960451E-22, a mining speed expected value [coin/hour] is 0.0000000003870762, and an exchange rate [¥/coin] is 1627000, the expected value of a mining amount [¥/hour] is 0.0006297730.

Further, for the virtual currency B, when it is assumed that a hash function is Lyra2REv2, a hash rate [MH/s] by a GPU is 60, the recent difficulty level is 74330.69278829, a mining expected value [coin/H] is 3.1323620824717-E15, a mining speed expected value [coin/hour] is 0.0006765902098138, and an exchange rate [¥/coin] is 1188, the expected value of a mining amount [¥/hour] is 0.8037891693.

In this case, because the expected value of a mining amount per hour is higher for the virtual currency B, the target-currency selection processing unit 22 decides the virtual currency B as the mining target currency.

Returning to the flowchart in FIG. 7A, the target-currency selection processing unit 22 updates the target currency information stored in the storage unit 2B at Step S127.

As described above, the mining target defined in the target currency information is not limited to the virtual currency.

For example, by deciding a mining target based on the time zone, instead of the virtual currency, mining of a blockchain not associated with a reward may be performed for a certain time period.

Accordingly, legitimate computing resources can be provided to the blockchain not associated with a reward.

Further, even in the case of performing mining with regard to the virtual currency, it is also possible that the mining target is not decided based on the expected value of a minable amount but the mining target is changed alternately for every predetermined time.

Alternatively, if mining with respect to the same virtual currency continues, while basically deciding the mining target according to the expected value of a minable amount, mining of other virtual currencies can be put therebetween.

Accordingly, legitimate computing resources can be provided to a relatively new blockchain of the virtual currency in which the number of participants is few and the number of connected blocks is few.

In the case of the virtual currency by a private chain issued and operated by a specific company (it is a closed mechanism and registration is required for performing mining), different from virtual currencies such as Bitcoin having an open mechanism, a reward for mining is set by the operating company. In this case, the virtual currency to be mined can be decided, taking into consideration the reward set by the company and the mining expected values of other virtual currencies (public chain).

Mining of the virtual currency by the private chain issued and operated by companies may be performed on a priority basis according to predetermined criteria.

However, if no transaction occurs in a private chain issued and operated by a company and there is no need for mining of the virtual currency (there is no request for mining), mining may be performed only taking the expected value of a minable amount into consideration.

If there is no mining request from a company to the participants who participate in mining of the virtual currency issued by the company, computing resources of the participants cannot be effectively utilized.

However, even if there is no mining request from the company, these participants can perform mining of other blockchains (virtual currencies) by being connected to the mining server 10 according to the present embodiment, to increase the rate of utilization of their computing resources.

Although there is no guarantee that a reward can be surely received in the mining of the virtual currency, a risk can be decreased by participating in parallel in mining of the virtual currency issued by a company.

Further, the most suitable mining target can be specified to user terminals connected to the distributed processing server 10, matching with hardware and software characteristics of the respective user terminals, rather than specifying the same mining target uniformly and transmitting a hash value of a previous block, data of the current block, and specification of a hash function to be used to the user terminals.

FIG. 8 is a flowchart for explaining search instruction transmission processing executed by the distributed processing server (search-instruction transmission processing unit) according to the present embodiment.

The search-instruction transmission processing unit 23 confirms the target currency information stored in the storage unit 2B at Step S131.

The search-instruction transmission processing unit 23 refers to the block data storage unit 27 at Step S132 to determine whether a new block has been received regarding the virtual currency to be mined specified in the target currency information.

When it is determined that a new block has been received (Yes at Step S132), the search-instruction transmission processing unit 23 generates a search range in which a Nonce value is divided by the number of participants of the mining pool at Step S133.

The search-instruction transmission processing unit 23 transmits data of the current block, a hash value of the previous block, and a search range for the target currency to the respective client apparatuses at Step S134.

Figure 9A:
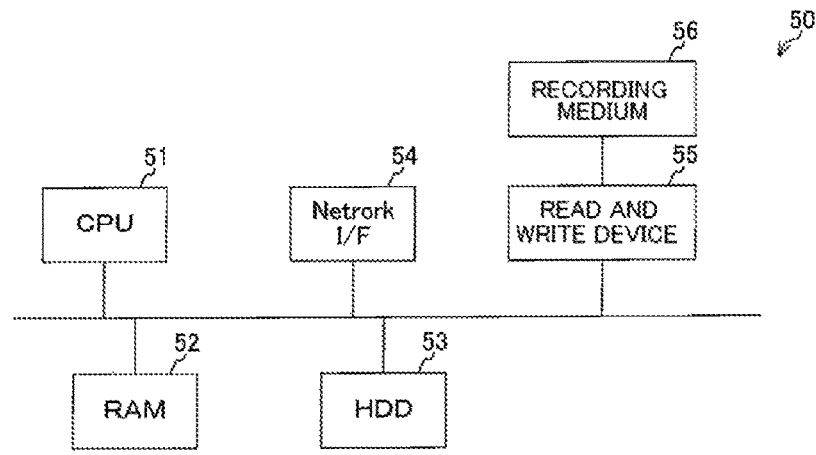
FIG. 9A is a hardware configuration diagram of a client apparatus according to the embodiment.
Figure 9B:
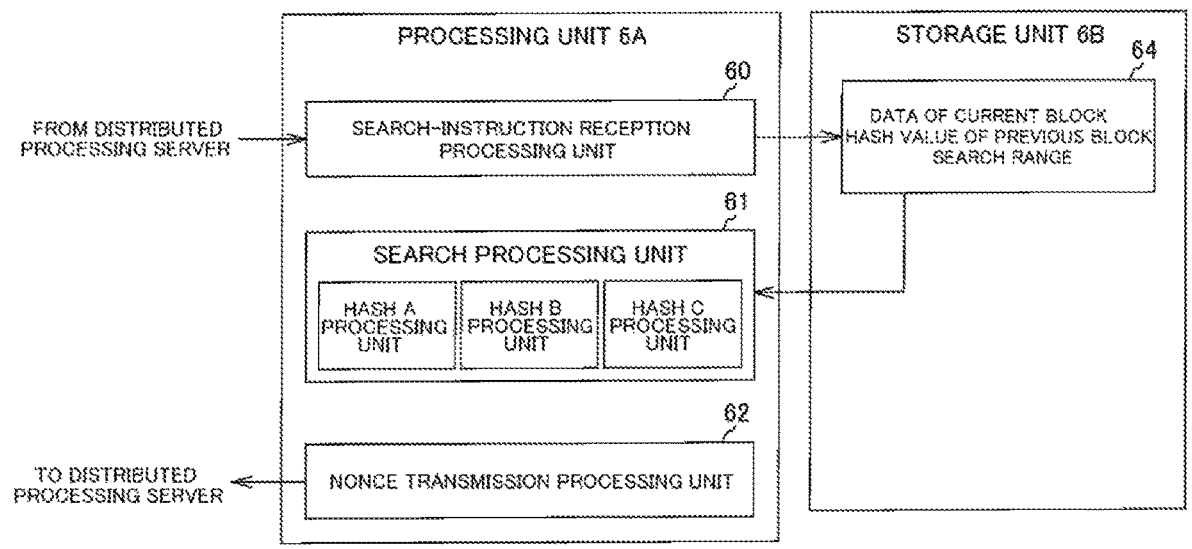
FIG. 9B is a functional configuration diagram of the client apparatus according to the embodiment.

FIG. 9A is a hardware configuration diagram of a client apparatus according to the present embodiment. FIG. 9B is a functional configuration diagram of the client apparatus according to the present embodiment.

As illustrated in FIG. 9A, the client apparatus 50 includes a CPU 51 being a processor that executes a general-purpose operating system for controlling the entire apparatus and executes a program (client program) for realizing the function of the client apparatus 50 and a mining tool, a RAM 52 in which various programs, temporary data, and variables are developed for the processing by the CPU 51, an HDD 53 and a ROM (not illustrated) in which programs and data are stored, a network I/F 54 for connecting the client apparatus 50 to a network, a read and write device 55, and a recording medium 56. The processor can be a control circuit such as a FPGA and an ASIC.

The read and write device 55 is controlled by the CPU 51 to perform read/write of data with respect to the detachable recording medium 56. The recording medium 56 stores various pieces of data therein. The recording medium 56 can memorize therein a client program, for example, for causing the CPU 51 to function as a processing unit 6A illustrated in FIG. 9B. The recording medium 56 is, for example, an SD memory card, an FD, a CD, a DVD, a BD, and a non-transitory computer readable recording medium (nonvolatile computer readable recording medium) such as a flash memory.

As illustrated in FIG. 9B, executing the processing program, the CPU 51 functions, for example, as the processing unit 6A. The processing unit 6A includes a search-instruction reception processing unit 60, a search processing unit 61, and a Nonce transmission processing unit 62.

These processing units correspond to the one generally referred to as "mining tool".

The search-instruction reception processing unit 60 receives a search instruction (data of the current block, a hash of a previous block, a search range, and specification of a hash function) from the distributed processing server 10 according to the present embodiment and other pool servers 40, and stores the received search instruction in a search instruction memory area 64 of a storage unit 6B.

The search processing unit 61 executes search processing of a Nonce value being a correct value based on the search instruction stored in the search instruction memory area 64.

The search processing unit 61 can execute hash processing (search processing) by a hash function different for each blockchain specified in the search instruction, and includes a hash A processing unit that executes processing by a hash function A used in the blockchain A, a hash B processing unit that executes processing by a hash function B used in the blockchain B, and a hash C processing unit that executes processing by a hash function C used in the blockchain C.

When a Nonce value being a correct value has been found by the search processing unit 61, the Nonce transmission processing unit 62 executes processing for transmitting the Nonce value to the distributed processing server 10 according to the present embodiment and other pool servers 40.

Figure 10:
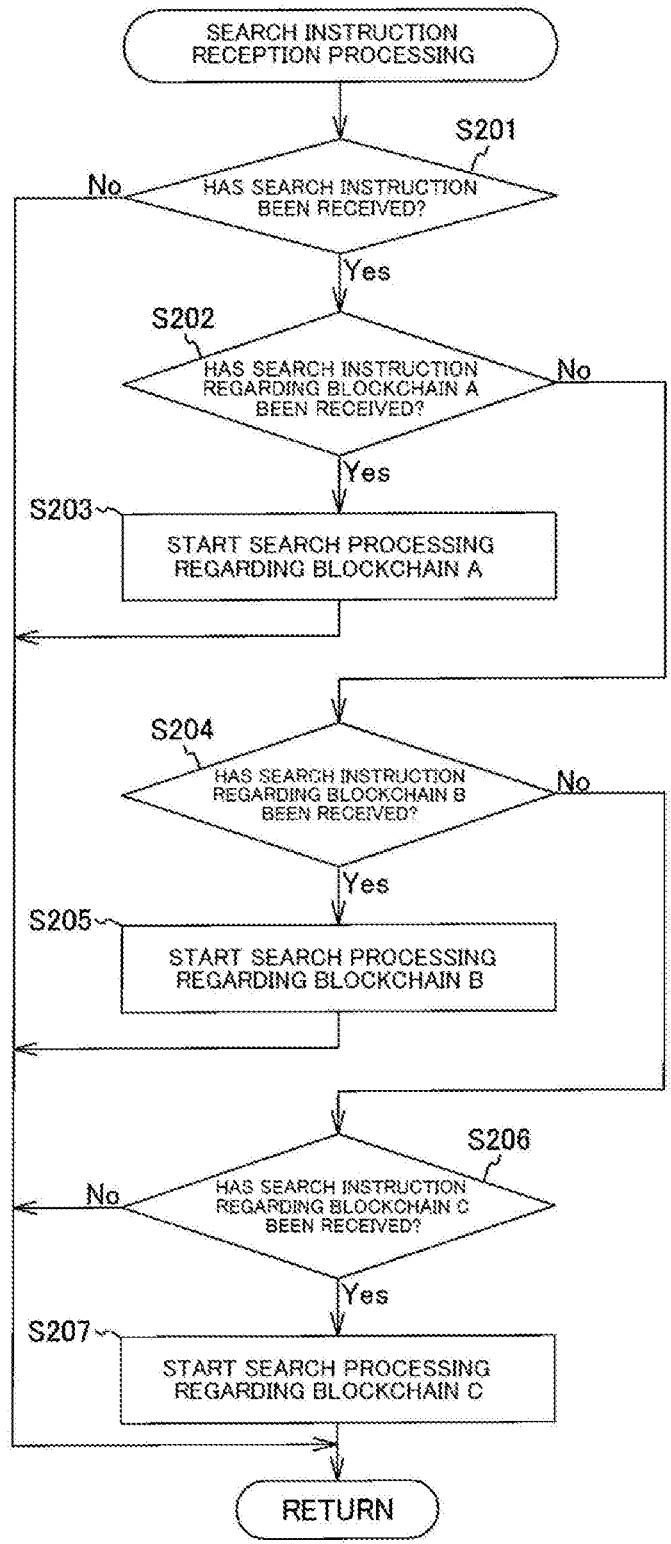
FIG. 10 is a flowchart for explaining search instruction reception processing executed by the client apparatus (search-instruction reception processing unit) according to the embodiment.

FIG. 10 is a flowchart for explaining the search instruction reception processing executed by the client apparatus (the search-instruction reception processing unit 60) according to the present embodiment.

The search-instruction reception processing unit 60 determines whether a search instruction has been received at Step S201.

When it is determined that a search instruction has been received (Yes at Step S201), the search-instruction reception processing unit 60 determines whether a search instruction regarding the blockchain network A has been received at Step S202.

When it is determined that a search instruction regarding the blockchain network A has been received (Yes at Step S202), the search-instruction reception processing unit 60 causes the hash A processing unit to start search processing based on the received search instruction at Step S203.

When it is not determined that a search instruction regarding the blockchain network A has been received (No at Step S202), the search-instruction reception processing unit 60 determines whether a search instruction regarding the blockchain network B has been received at Step S204.

When it is determined that a search instruction regarding the blockchain network B has been received (Yes at Step S204), the search-instruction reception processing unit 60 causes the hash B processing unit to start search processing based on the received search instruction at Step S205.

When it is not determined that a search instruction regarding the blockchain network B has been received (No at Step S204), the search-instruction reception processing unit 60 determines whether a search instruction regarding the blockchain network C has been received at Step S206.

When it is determined that a search instruction regarding the blockchain network C has been received (Yes at Step S206), the search-instruction reception processing unit 60 causes the hash C processing unit to start search processing based on the received search instruction at Step S207.

The client apparatus according to the present embodiment can switch the search processing of the correct value by different hash processing units dynamically based on the search instruction received from the distributed processing server 10.

The mining tool to be installed in a PC or the like, which has been conventionally used for mining basically deals with only a single hash function and mining of the virtual currency corresponding thereto. However, the client apparatus according to the present embodiment can deal with mining of different types of virtual currencies.

Figure 11:
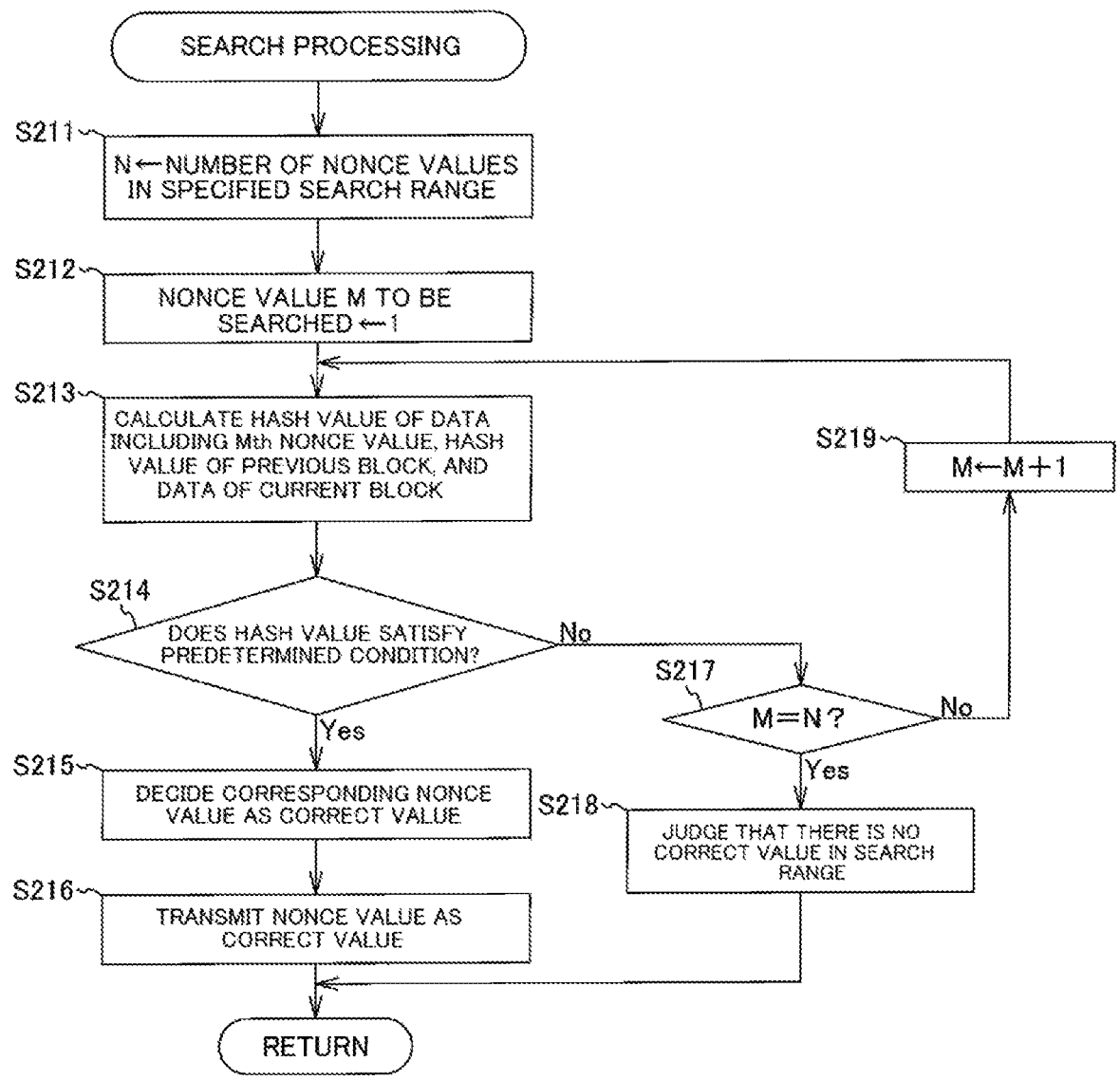
FIG. 11 is a flowchart for explaining search processing executed by the client apparatus (search processing unit) according to the embodiment.

FIG. 11 is a flowchart for explaining search processing executed by the client apparatus according to the present embodiment.

The search processing unit 61 sets (substitutes) the number of Nonce values in the search range specified in the search instruction to a variable N set in the RAM 52 at Step S211.

At Step S212, the search processing unit 61 sets 1 to a variable M set in the RAM 52, which indicates what number the Nonce value to be searched is.

At Step S213, the search processing unit 61 calculates a hash value of data including pieces of data of the Mth (in the case of M=1, the first) Nonce value (if any of "0" to "99" is allocated as the search range, "0"), a hash value of the previous block, and data of the current block.

At Step S214, the search processing unit 61 determines whether the calculated hash value satisfies a predetermined condition. The predetermined condition is, for example, in the case of proof of work, such that zeroes more than a predetermined number are lined up in the high-order digits of the calculated hash value.

When it is determined that the condition is satisfied (Yes at Step S214), the search processing unit 61 decides the corresponding Nonce value as a correct value at Step S215.

The Nonce transmission processing unit 62 transmits the Nonce value of the correct value to the distributed processing server 10 or other pool servers 40 and miner apparatuses at Step S216.

When it is not determined that the condition is satisfied (No at Step S214), the search processing unit 61 determines whether M=N, that is, search has been performed for all the allocated Nonce values at Step S217.

When it is determined that M=N is established (Yes at Step S217), the search processing unit 61 judges that there is no correct value in the allocated search range at Step S218, to end the processing.

When it is not determined that M=N is established (No at Step S217), the search processing unit 61 substitutes M+1 to the variable M at Step S219, and returns the process to Step S213 to perform the search processing for the next Nonce value.

Figure 12:
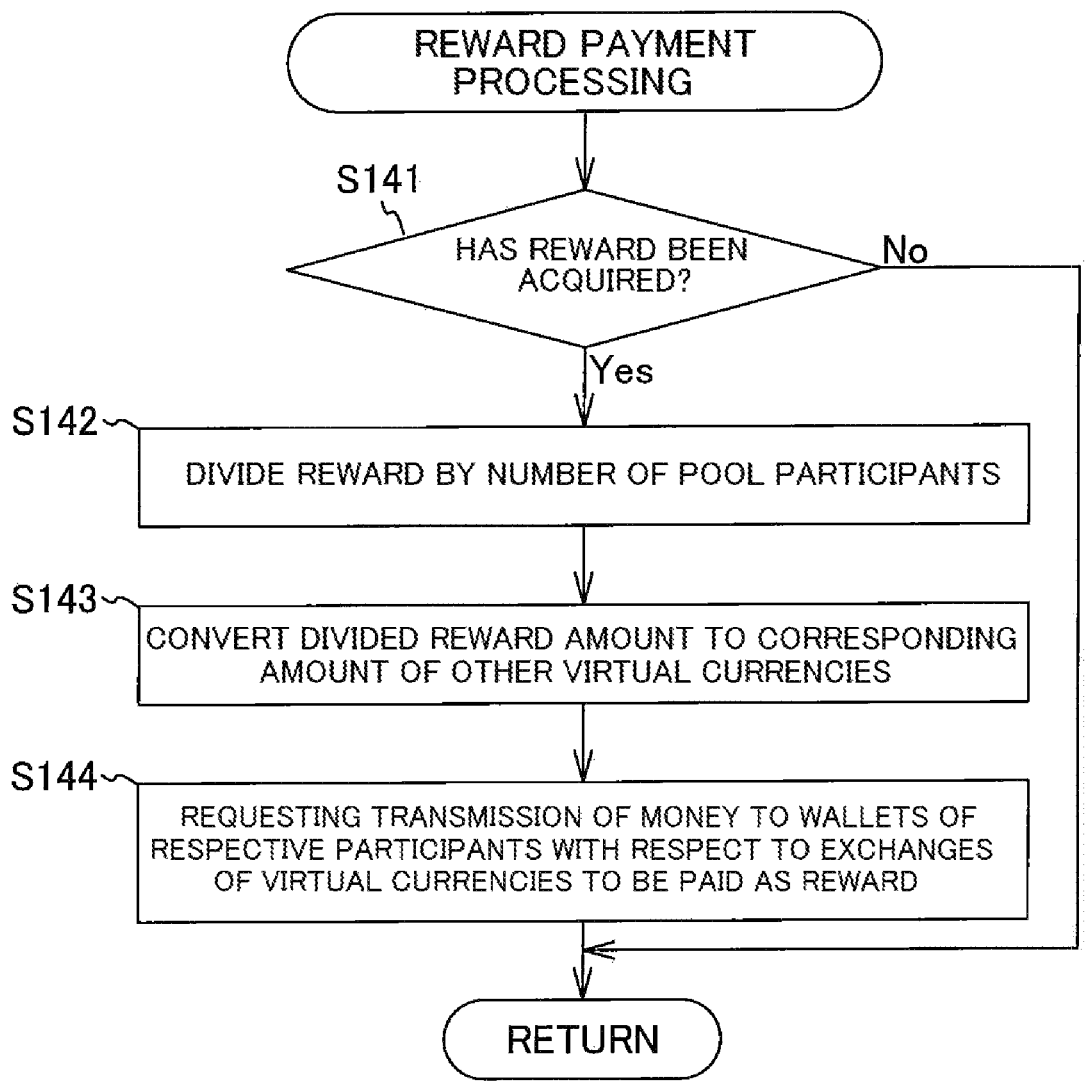
FIG. 12 is a flowchart for explaining reward payment processing executed by the distributed processing server (reward payment processing unit) according to the embodiment.

FIG. 12 is a flowchart for explaining reward payment processing executed by the distributed processing server (reward payment processing unit) according to the present embodiment.

The reward payment processing unit 26 determines whether a reward has been acquired with regard to any blockchain (virtual currency) at Step S141.

This can be judged based on information or the like indicating whether money is paid to the wallet of the operator of the distributed processing server 10 according to the present embodiment is credited.

When it is determined that a reward has been acquired (Yes at Step S141), the reward payment processing unit 26 decides the reward amount per participant by dividing the acquired reward by the number of pool participants at Step S142.

The reward payment processing unit 26 converts the reward amount per participant to a corresponding amount of other virtual currencies preset for respective participants at Step S143.

For the processing, an exchange rate between the legal currency (such as Japanese Yen, US dollar, or Chinese yuan) and the virtual currency stored in the currency information storage unit 28 can be utilized.

When Conversion (exchange) of values is performed between virtual currencies, the value may be converted at a rate based on the legal currency.

After conversion finishes, the reward payment processing unit 26 executes processing for requesting remittance processing to the wallets of the participants with respect to the exchanges of virtual currencies to be paid as a reward, at Step S144.

With the configuration described above, according to the mining system of the present embodiment, participants connected to the server apparatus (distributed processing server) can participate in the mining work related to a plurality of blockchains.

The blockchains include chains related to virtual currencies such as Bitcoin, which has become popular sufficiently to secure a sufficient number of miners and can pay rewards, chains related to virtual currencies with a risk of fork by malicious attackers because of being shortly after launching and having few number of miners, and chains not related to virtual currencies in which mining rewards are not paid.

While participants can receive mining rewards of Bitcoin, the participants can participate in the mining work without compensation or the mining work of a new virtual currency during a spare time.

Therefore, according to the present invention, when a virtual currency using a blockchain is newly launched or for a blockchain other than the virtual currency, a sufficient scale of computing resources by client apparatuses that perform legitimate mining can be secured easily.

On the other hand, when mining of the virtual currency is to be performed, a blockchain (virtual currency) having the best reward efficiency is decided among a plurality of blockchain systems and the block information and the like are transmitted to the client apparatuses.

Accordingly, profit of participants can be maximized as compared to a case where only mining of a specific virtual currency is performed. Therefore, motivation of participants can be enhanced, and a sufficient scale of computing resources can be easily secured by the client apparatuses that perform legitimate mining.

Further, because the number of client apparatuses connected to the distributed processing server according to the present embodiment increases, computing resources useful for business operators who intend to newly launch a private chain can be provided.

As described above, in the present embodiment, the distributed processing server 10 can acquire data from a plurality of different data sources (blockchains), and decides one data source among the data sources based on a predetermined condition.

Thereafter, the distributed processing server 10 transmits information including at least target data (block data) acquired from the decided data source and a data processing method appropriate to the target data (specification of a hash function) to the respective client apparatuses 50.

The client apparatuses 50 executes data processing based on the target data and the data processing method. The client apparatuses 50 transmit result information of data processing to the distributed processing server 10 and the distributed processing server 10 receives the pieces of result information.

The configuration is not limited to the server apparatus and the client apparatus used in the blockchain system, and the similar mechanism can be applied to other distributed processing systems.

Figure 13:
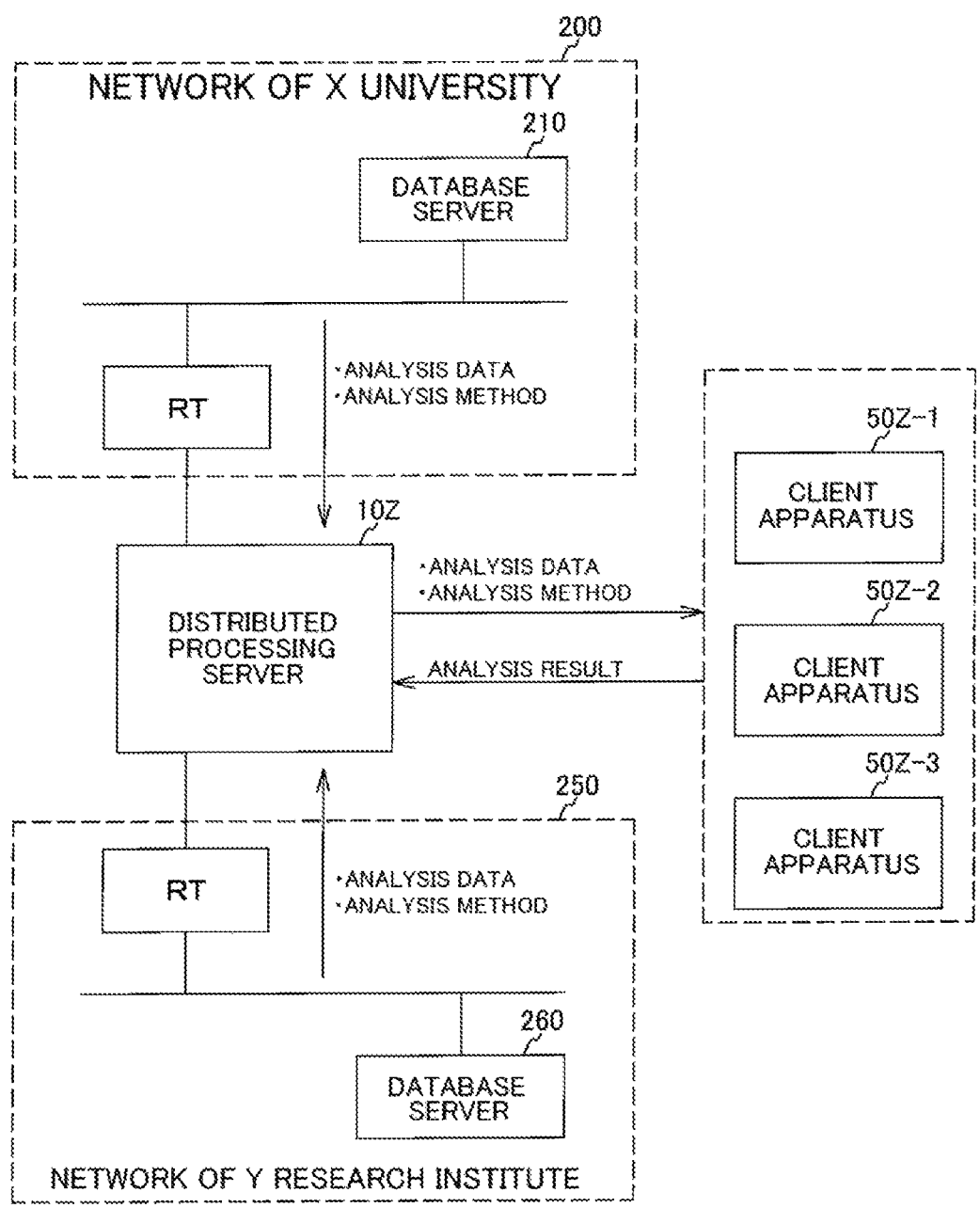
FIG. 13 is a diagram illustrating another example of a distributed processing system to which the distributed processing server according to the embodiment is applied.

FIG. 13 is a diagram illustrating another example of a distributed processing system to which the distributed processing server according to the present embodiment is applied.

In FIG. 13, a distributed processing server 10Z according to the present embodiment can be connected to a plurality of different networks through the Internet.

For example, the distributed processing server 10Z is connected to a network 200 of X University via a router and can acquire analysis data from a database server 210 open to the public.

The distributed processing server 10Z can be connected also to a network 250 of Y Research Institute via a router and can acquire analysis data from a database server 260 open to the public.

The distributed processing server 10Z accepts connection of a plurality of client apparatuses 50Z (50Z-1, 50Z-2, 50Z-3).

Pieces of data acquired from the respective database servers 210 and 260 are divided data based on distributed processing. As a representative example, chemistry between a substance causing an epidemic such as cancer and leukemia and a substance having a possibility of controlling the activity of the substance causing the epidemic is to be confirmed by calculation or the like.

The data contents and the calculation method are naturally different according to the target epidemic and the substance.

Participants generally install dedicated software to the client apparatus held by themselves, access the respective database servers individually by using the client apparatus to acquire the divided data, and participate in the analysis.

On the other hand, in the present embodiment, the client apparatus of the participant is connected to the distributed processing server 10Z.

The distributed processing server 10Z regularly acquires divided data from the database servers 210 and 260 and stores the acquired divided data in a data storage unit of a storage unit.

The distributed processing server 10Z decides data to be transmitted to the client apparatuses based on a predetermined condition by the CPU 11 (target-data selection processing unit) and transmits the data decided by the CPU 11 (analysis-instruction transmission processing unit) to the client apparatuses.

The client software to be installed in the client apparatus has a function of switching an analysis tool according to the data received from the server.

The client apparatus having received the data performs analysis based on the specified analysis method and the divided data and transmits analysis result information to the distributed processing server 10Z.

As the criteria used by the target-data selection processing unit to decide the data to be transmitted to the client apparatus, for example, time zone and analysis situations in the respective systems can be variously considered.

With the configuration described above, the client apparatus participating in the distributed processing can be connected to the distributed processing server 10Z to participate in a plurality of projects, which will be a great help to a project struggling to secure computing resources.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:

1. A server apparatus for management of a mining pool connected to a plurality of client apparatuses which perform mining, the server apparatus comprising:
   a selection unit which selects a first blockchain to be a mining target from a plurality of blockchains;
   a transmission unit which transmits a first computing method instruction and a first data, which are used in mining of the first blockchain, to the plurality of client apparatuses;

a reception unit which receives a computing result obtained by processing the first data using the first computing method from the plurality of client apparatuses;

a receiving unit which receives a reward of a first currency by transmitting the computing result to the first blockchain; and a payment unit which distributes the reward to the plurality of client apparatuses and pays the client apparatuses an amount of a second currency corresponding to an amount of the first currency distributed to the client apparatuses when types of the second currency to be paid to the client apparatuses as the reward and the first currency are different.

2. The server apparatus according to claim 1, wherein the payment unit exchanges the first currency into the second currency using a rate between the first currency and a legal currency and a rate of the second currency and the legal currency as a reference and the exchanged second currency is paid to the client apparatuses when the payment unit pays the client apparatuses the amount of the second currency corresponding to the amount of the first currency.

3. The server apparatus according to claim 1, wherein the first computing method instruction includes a hash function used in mining of the first blockchain and a search range of Nonce to be searched by each of the client apparatuses;

the first data includes data of a new block connected to the first blockchain and a hash value of a block immediately before the new block;

the computing result includes Nonce which is correct in the mining process of the first blockchain; and the client apparatus uses the hash function used in the mining of the first blockchain, the data of the new block, and the hash value of the block immediately before the new block to execute a process of searching the correct Nonce from the search range allocated, when the correct Nonce is found, the computing result is transmitted to the server apparatus.

4. The server apparatus according to claim 1, wherein the plurality of blockchains includes a blockchain in which an operating mother organization sets the reward amount; and the selection unit selects the first blockchain with a high expected value of reward from the plurality of blockchains.

5. The server apparatus according to claim 1, wherein the payment unit pays a common type of the second currency to the plurality of client apparatuses.

6. A processing system comprising:

a server apparatus for management of a mining pool connected to a plurality of client apparatuses which perform mining, and the plurality of client apparatuses, wherein the server apparatus includes:

a selection unit which selects a first blockchain to be a mining target from a plurality of blockchains;

a first transmission unit which transmits a first computing method instruction and a first data, which are used in mining of the first blockchain, to the plurality of client apparatuses;

a first reception unit which receives a computing result obtained by processing the first data using the first computing method from the plurality of client apparatuses;

a receiving unit which receives a reward of a first currency by transmitting the computing result to the first blockchain; and a payment unit which distributes the reward to the plurality of client apparatuses and pays the client apparatuses an amount of a second currency corresponding to an amount of the first currency distributed to the client apparatuses when types of the second currency to be paid to the client apparatuses as the reward and the first currency are different, wherein the plurality of client apparatuses includes:

a second reception unit which receives the first computing method and the first data;

a processing unit which performs a computing to process the first data using the first computing method;

a second transmission unit which transmits the computing result by the processing unit to the server apparatus.

7. The processing system according to claim 6, wherein the first computing method instruction includes a hash function used in mining of the first blockchain and a search range of Nonce to be searched by each of the client apparatuses;

the first data includes data of a new block connected to the first blockchain and a hash value of a block immediately before the new block;

the computing result includes Nonce which is correct in the mining process of the first blockchain;

in the client apparatuses, the second reception unit receives the hash function used in the mining of the first blockchain, the data of the new block, and the hash value of the block immediately before the new block;

the processing unit uses the hash function used in the mining of the first blockchain, the data of the new block, and the hash value of the block immediately before the new block to execute a process of searching the correct Nonce from the search range allocated; and the second transmission unit transmits the computing result is to the server apparatus when the correct Nonce is found.

8. A computer-readable nonvolatile storage medium storing a program for causing a processor of a server apparatus which manages a mining pool connected to a plurality of client apparatuses which perform mining to execute a processing method, the processing method comprising:

selecting a first blockchain to be a mining target from a plurality of blockchains;

transmitting a first computing method instruction and a first data, which are used in mining of the first blockchain, to the plurality of client apparatuses;

receiving a computing result obtained by processing the first data using the first computing method from the plurality of client apparatuses;

receiving a reward of a first currency by transmitting the computing result to the first blockchain;

distributing the reward to the plurality of client apparatuses; and paying the client apparatuses an amount of a second currency corresponding to an amount of the first currency distributed to the client apparatuses when types of the second currency to be paid to the client apparatuses as the reward and the first currency are different.

* * * * *